3,208,836
COLD PRESS METHOD OF MAKING ABRASIVE ARTICLES
Joseph M. Biglin and Jerry J. Greaves, Sidney, N.Y., assignors to The Borden Company, New York, N.Y., a corporation of New Jersey
No Drawing. Filed Sept. 9, 1960, Ser. No. 54,861
5 Claims. (Cl. 51—293)

This invention relates to the manufacture of abrasive articles and has particular reference to a method of making abrasive wheels of high density by cold pressing resin coated abrasive grains.

Resin coated abrasive grains have been used to prepare abrasive articles such as wheels and blocks by pressing the coated grains under heat and pressure. Hot pressing is disadvantageous in that expensive heating equipment is required and in the fact that the expense of heating increases the cost of making the articles.

Pressing without heat, i.e., cold pressing, has been tried heretofore in an effort to overcome these difficulties. However, cold pressing of resin coated grains has not been satisfactory and dependable in giving abrasive articles of high density which can be achieved by hot pressing. Heretofore, cold pressing procedures have resulted in products which lack dimensional stability during the cure cycle, i.e., the molded articles swell and blister on curing making them unsuitable for use. The dimensional instability is particularly prevalent in the curing of abrasive articles of substantial thickness.

These difficulties are overcome by this invention which provides a cold press method of making abrasive articles of high strength and density which exhibit excellent dimensional stability, will not swell or blister, during the cure cycle.

Briefly stated, this invention comprises mixing abrasive grains with a single stage liquid pick-up phenolic resin, heating the mixture until the resin contains 15% by weight or less of volatiles, based on the weight of the resin, discontinuing the heating, and then admixing the grains with a two-stage dry phenolic resin so as to apply a coating thereof over the initial resin coating.

In accordance with the present invention abrasive grains are charged into a muller and mixed. While being mixed they are heated, preferably by blowing hot air over the grains, until the grains reach a temperature of from 120°– 250° F. The grains are heated in order to supply heat required to reduce the volatile content of the liquid resin to be applied to the grains. A single stage liquid phenolic resin (resole) is then added to the heated grains and the heating and mixing are continued until the grains are coated with the resin and the required amount of the volatiles have been removed from the resin.

The temperature to which and time for which the grains and resole are heated are dependent upon the curing time and temperature of the resin used, the percentage of volatiles contained therein and such factors as size of the muller, its efficiency, and the size of the charge placed in the muller. The time and temperature of treatment must be sufficient to remove the desired percentage of volatiles from the resin without curing the same. Heretofore, any heating of the resole pick-up resin was solely to place it in a fluid condition so as to coat the abrasive grains and did not substantially affect the volatile content of the resole.

The percentage of volatiles removed must be such that the liquid resin has only 15%, or less, based on the total weight of the resin, of volatiles left. It is preferred to heat the resin until only 2–5% of the volatiles remain.

The heating of the mixture is then stopped and a two stage phenolic resin mixture is added to the mulling mixture. The two stage resin has admixed therewith a form-aldehyde donor, such as hexamethylenetetramine, and may or may not contain fillers. Preferably, the resin is blended with fillers prior to being added to the muller. The blended resin-filler mixture is added to the muller, preferably in increments, and the mulling is continued until the abrasive grains are coated with the resin and 100% pick up of this dry resin is obtained.

After the abrasive grains are thoroughly coated they are discharged from the muller as free flowing grains which can be immediately charged into the mold and cold pressed into the shape desired. The coated grains are pressed to a high overall density, such as in the range of 3.0 to 3.4 grams per cubic centimeter, using pressures up to 5,000 p.s.i. After pressing the shaped mass is put into a curing cycle where the mass is heated to cure the resins.

The curing cycle employed varies and depends upon the resins used, cross-sectional thickness of the abrasive article being cured, and degree of hardness desired. Ordinarily the shaped masses are cured by heating for 12 to 56 or more hours at temperatures ranging from 75 to 380° F. In general the temperature is slowly raised to the temperature desired. The cured abrasive articles are cooled evenly to prevent any internal stresses which might later cause the articles to fail under service conditions. In commercial practice, the articles are slowly cooled to room temperature while maintaining a uniform temperature throughout the cooling area. The curing process employed is the conventional one used in the manufacture of abrasive articles.

If desired, after the abrasive grains are coated with the dry two stage resin they can be cooled to room temperature and stored. Such coated grains have an excellent shelf life and can be stored for long periods of time. When they are to be molded they are first mixed with a tackifying agent such as furfural, charged into a mold, and then cold pressed and cured as noted above. It is possible to achieve abrasive articles having the same density as the freshly prepared coated resins set forth above.

As to materials, the abrasive grains used are the manufactured abrasive such as fused alumina (aluminum oxide), boron carbide, and silicon carbide, the natural abrasive materials such as corundum, flint, garnet, sand and emery, and mixtures of the manufactured and/or natural abrasive materials. The abrasive grains used are dependent upon the properties desired in the final abrasive article. In the manufacture of abrasive wheels or other abrasive articles of maximum hardness aluminum oxide is the preferred abrasive.

The single stage liquid pick-up resin used can be any alkali-catalyzed phenol formaldehyde resole used in making abrasive articles. They are made by condensing one more or mole or formaldehyde per mole of phenol under alkaline conditions. Resoles can be used which have a viscosity ranging from 20 to 5,000 cps. and a volatile content of 20 to 40 percent, based on the weight of the resin. Higher viscosity resins can be employed provided adequate heat and time are employed in the mulling operation. It is preferred, however, to use resoles having a viscosity of 400–800 cps. and a volatile content of 25–35%. Specific examples of suitable resoles are: (a) A water soluble phenol formaldehyde resin obtained by condensing one mole of phenol with two moles of formaldehyde at a pH of 8.0 whereby a water soluble product of 65% solids concentration and viscosity of 400 cps. is obtained. (b) A phenol formaldehyde resin solution obtained by condensing one mole phenol with 1.5 moles of formaldehyde at a pH of 7.4 until the resin is no longer water soluble, removing the water by distillation and thereafter diluting the resin with denatured ethyl alcohol in an amount required to yield a product of 70% solids concentration and viscosity of 800 cps.

As to the two stage resin, conventional phenol formaldehyde resins of the novolak type are employed. These resins are made by condensing one mole of phenol with less than one mole of formaldehyde under acidic conditions. Additional formaldehyde, preferably in the form of hexamethylenetetramine, is admixed with the resin in order to provide a resin which will cure to an infusible and insoluble stage in the presence of heat. It is also possible to use alloys of these resins with epoxy resins and various polyvinyl compounds such as polyvinyl butyral. The resins are used dry and preferably in finely ground (powdered) form. Specific examples of suitable novolak resins are (A) A resin prepared by condensing one mole of phenol with 0.8 mole formaldehyde in the presence of sulfuric acid under reflux conditions, followed by dehydration of the resin, and cooling to a solid form. The solid resin is converted to a two-stage composition by pulverizing the resin with 7.5% of its weight of hexamethylenetetramine. (B) A resin prepared under the same conditions as in (A) employing one mole of phenol, 0.7 mole of formaldehyde, and oxalic acid as the condensation catalyst. The dehydrated and solidified resin is converted to a two-stage resin by being pulverized with 14% of its weight of hexamethylenetetramine.

It is preferred to admix with the two stage resin and converter a solid, finely divided, chemically inert, mineral filler such as cryolite (sodium fluoaluminate, mineral form), lime, magnesium oxide, asbestos, and barytes prior to adding the resin to the coated grains.

As previously set forth, if the coated abrasive grains are to be stored prior to being cold pressed a tackifier is added to the grains before they are charged into the mold. The tackifier used can be any material which has a solvent or softening effect on the two-stage resin and which does not volatilize appreciably under the conditions of cure employed. Examples of such low volatility tackifiers are furfural, furfuryl alcohol, and tricresyl phosphate.

Proportions of materials that are permissible and those that are recommended for best commercial results are shown in the following table.

|  | Parts By Weight | |
| --- | --- | --- |
|  | Permissible | Commercial Recommendation |
| Abrasive grains | 100 | 100 |
| Single stage liquid phenolic resin | 0.5–8 | 1.5 |
| Two stage dry phenolic resin (Including formaldehyde donor) | 3–25 | 5–12 |
| Fillers therein | 0–12 | 0–9 |
| Tackifier | 0.01–0.05 | 0.01–0.03 |

An important feature of the process is the heating of the single stage liquid resin and abrasive granules to coat the granules and remove substantially all of the volatiles from the liquid resin. While not intending to be bound thereby it is considered that it is this heating of the resin to remove the volatiles that permits coating of the resin with 100% of the two stage resin and prevents swelling and blistering of the pressed articles during the curing cycle. The volatiles removed during this heating step are the phenol, formaldehyde, and solvent water, or other solvent.

Since resoles are cured by heat care must be exercised in this heating. Thus for each type of single stage liquid pick-up resin used the temperature to be used and length of time of heating must be predetermined in order to insure that the required percentage of volatiles are removed but that the resins are not cured. This is a simple procedure which involves the heating of the resin on a hot plate to determine the length of time required to drive off the required amount of volatiles. The results can be further checked and judged by preparing and testing bars of the abrasive grains, a testing procedure common in the abrasive industry. For commercially available liquid phenol-formaldehyde resoles such as an alkaline condensed resin made up of one mole phenol and 1.75 moles formaldehyde heating for 2–4 minutes at a grain temperature, i.e., temperature of grains being coated, of from 120° F.–250° F. is ordinarily sufficient.

The curing of the resins must come after the coated grains are cold pressed to insure the cohesiveness necessary to bind the resin layers together as well as to the abrasive grains.

The invention will be further illustrated by detailed description in connection with the following specific examples of the practice of it. In these examples and elsewhere herein proportions are expressed as parts by weight, unless specifically stated to the contrary.

*Example 1*

|  | Parts by weight (lbs.) |
| --- | --- |
| Aluminum oxide | 100 |
| Single stage liquid phenol-formaldehyde resin (72% resin solids) | 3.0 |
| Cryolite | 8.7 |
| Two stage dry phenol-formaldehyde resin (containing 8.6% hexamethylenetetramine) | 8.7 |

The aluminum oxide grains were placed in a Simpson muller and mixed while hot air with temperature at 350° F. was blown over the grains until the grains reached a temperature of 165° F. A single stage liquid phenolic resin was added to the muller with the hot air on and mulled for approximately two minutes at a temperature of 165° F. The resin now contained only 5% volatiles. The heating was stopped and the preblended mixture of the two stage phenolic resin and the cryolite was added in four equal increments to the muller and mixed for about 5 minutes with the coated abrasive at which time all of the phenolic resin was coated onto the abrasive grains. The mix was discharged from the muller. The coated granules were then cooled to room temperature and stored.

The coated grains were then admixed with furfural (10 cc. for every 100 lbs. of the coated grains) and then cold pressed at a pressure of 5,000 p.s.i. into 3 abrasive wheels measuring 10 inches x 1 inch and 3 abrasive wheels measuring 10 inches x 2½ inches. All of the wheels had a 1 inch bore. The density of all the wheels was 3.04 grams per cc. These wheels were then cured at a gradually increasing temperature of from 70° F. up to 350° F. for a period of 36 hours. There was no blistering or swelling of the wheels after cure showing their excellent dimensional stability. Flexural bars of this composition prepared under identical conditions had a flexural strength in excess of 4,000 p.s.i.

*Example 2*

A coated abrasive grain was made under the identical conditions set forth in Example 1 with the exception that the liquid resin was mulled with the grains for a period of only 1 minute. The resin contained approximately 20% volatiles. Three abrasive wheels measuring 10 inches x 1 inch were made from these grains by first cold pressing the grains to a density of 3.04 grams per cc. and cured under the identical conditions set forth in Example 1. After final curing the wheels were swollen and blistered and thereby unsuitable for use.

*Example 3*

|  | Parts |
| --- | --- |
| Silicon carbide | 100 |
| Single stage phenolic resins (67% solids) | 3.0 |
| Two stage phenolic resin (including hexamethylenetetramine) | 8.7 |
| Magnesium oxide | 8.7 |

The silicon carbide was charged into a Simpson muller and hot air at 225° F. was blown over the grains for approximately 10 minutes at which time the temperature of the grains was about that of the heated air. The phenol formaldehyde single stage resin was then added to the heated grains and mulled therewith for a period of about 2 minutes until the volatile content of the resin was approximately 10%. (The length of time and temperature that it would take to remove the water and other volatiles from the resole had been determined by making test bars.)

The two stage phenol formaldehyde resin was first admixed with the magnesium oxide. This preblended mixture was then added to the muller in increments until the abrasive grains were coated and all of the resin was picked up by the grains. The hot coated grains were then discharged from the muller into a mold and pressed into abrasive wheels having a density range of 3.04 to 3.4 grams per cc. using pressures up to 5,000 pounds per square inch.

Wheels made from these grains were then cured by heating for 36 hours at a temperature gradient of from 75° up to 350° F. and then allowed to cool. There was no blistering or swelling of the wheels.

*Example 4*

The procedures as set forth in Examples 1 and 3 are followed except that boron carbide, corundum, flint, garnet, sand, emery, and mixtures of these abrasives are substituted for the aluminum oxide and silicon carbide used therein.

In every instance cold pressing and curing of the coated grains results in dimensionally stable abrasive articles that have no swelling or blistering.

*Example 5*

Varying proportions of the resins are used all within the ranges set forth in the table above and the procedure of Examples 1 and 3 are followed.

In every case a coated grain is obtained which upon cold pressing and curing will form abrasive articles which show no swelling or blistering after curing.

It should be noted that in applicants' process it has been found possible to coat 100% of the dry two stage phenolic resin onto the abrasive grains and to store such free-flowing grains for long periods of time without any danger of curing of the resins. By the simple addition of a tackifier, such as furfural, to these stored grains they can be reactivated and pressed into abrasive articles having characteristics, such as density, which were heretofore attainable only by the hot pressing technique.

It will be understood that it is intended to cover all changes and modifications of the examples of the invention herein chosen for the purpose of illustration which do not constitute departure from the spirit and scope of the invention.

We claim:

1. In the process of making abrasive articles of high density by cold pressing resin coated abrasive grains, the improvement which comprises heating the abrasive grains, mixing them with a single stage liquid phenol aldehyde resin, continuing the heating and mixing until the resin contains only 2–5% of volatiles, based on the total weight of the resin, and the grains are coated with the resin, and then coating said grains with a dry two-stage heat hardenable phenol aldehyde resin mixed with a solid, finely divided, chemically inert, mineral filler.

2. In a process of making an abrasive article of high density by cold pressing resin coated abrasive grains, the improvement which comprises heating 100 parts by weight of abrasive grains to a temperature of from about 120° F. to 250° F., mixing said heated grains with from about 0.5 to 8.0 parts by weight of a single stage phenol formaldehyde resin, continuing the mixing and heating until resin contains only 2–5% volatiles, based on the total weight of the resin, and the grains are coated with the resin, admixing with said grains to coat the same from about 3–25 parts by weight of a powdered two stage heat hardenable phenol formaldehyde resin, and cold pressing said coated abrasive grains while still hot into a shaped mass.

3. The process according to claim 1 in which a low volatile tackifier is admixed with the coated grains just prior to pressing.

4. The process according to claim 1 in which the two stage resin is incrementally added to said abrasive grains.

5. The process according to claim 1 in which the two stage resin is blended with a solid, finely divided, chemically inert, mineral filler prior to being admitted with said grains.

References Cited by the Examiner

UNITED STATES PATENTS

| | | | |
|---|---|---|---|
| 1,901,325 | 3/33 | Novotny | 51—298 |
| 2,008,723 | 7/35 | Mills | 51—298 |
| 2,076,517 | 4/37 | Robie | 51—298 |
| 2,084,534 | 6/37 | Martin et al. | 51—298 |
| 2,092,903 | 9/37 | Benner et al. | 51—298 |
| 2,111,248 | 3/38 | Novotny | 51—298 |
| 2,294,239 | 8/42 | Novotny et al. | 51—298 |
| 2,448,985 | 9/48 | Kuzmick et al. | 51—298 |
| 2,734,813 | 2/56 | Zalud | 51—298 |

ALEXANDER H. BRODMERKEL, *Primary Examiner.*

JOSEPH REBOLD, JOHN R. SPECK, MORRIS LIEBMAN, *Examiners.*